(12) United States Patent
Belliveau

(10) Patent No.: US 12,036,910 B2
(45) Date of Patent: Jul. 16, 2024

(54) EQUIPMENT TRAILER WITH DUAL LANDING GEAR, FOR SHORT/LONG TERM PARKING

(71) Applicant: Gary Belliveau, Digby County (CA)

(72) Inventor: Gary Belliveau, Digby County (CA)

(\*) Notice: Subject to any disclaimer, the term of this patent is extended or adjusted under 35 U.S.C. 154(b) by 699 days.

(21) Appl. No.: 17/300,083

(22) Filed: Mar. 4, 2021

(65) Prior Publication Data

US 2021/0284057 A1 Sep. 16, 2021

Related U.S. Application Data

(60) Provisional application No. 63/100,392, filed on Mar. 10, 2020.

(51) Int. Cl.
*B60P 3/07* (2006.01)
*B60S 9/04* (2006.01)
*B60S 9/10* (2006.01)

(52) U.S. Cl.
CPC . *B60P 3/07* (2013.01); *B60S 9/04* (2013.01); *B60S 9/10* (2013.01)

(58) Field of Classification Search
CPC ...... B60D 1/66; B60P 1/16; B60P 3/06; B60P 3/07; B60P 9/04; B60S 9/04; B60S 9/10; B60S 9/12
USPC ........................................................ 280/475
See application file for complete search history.

(56) References Cited

U.S. PATENT DOCUMENTS

| | | |
|---|---|---|
| 1,840,435 A | 1/1932 | Davis |
| 2,257,324 A | 9/1941 | Behm et al. |
| 2,572,410 A | 10/1951 | Van Doorne |
| 2,806,710 A | 9/1957 | Mascaro |
| 2,957,593 A | 10/1960 | Evans |
| 3,347,563 A | 10/1967 | Harbers |
| 3,503,588 A | 3/1970 | Bach |
| 3,512,802 A | 5/1970 | LaRock, Jr. |
| 4,232,879 A | 11/1980 | Boxrud |
| 4,318,656 A | 3/1982 | Ezell |
| 4,494,766 A | 1/1985 | McHugh et al. |
| 4,806,065 A | 2/1989 | Holt et al. |
| 5,288,197 A | 2/1994 | Harris |
| 5,388,849 A | 2/1995 | Arsenault et al. |
| 5,409,251 A | 4/1995 | Thorndyke |
| 5,509,687 A | 4/1996 | Thorndyke |
| 5,597,174 A | 1/1997 | Christenson et al. |
| 5,785,341 A | 7/1998 | Fenton |
| 5,836,603 A | 11/1998 | Logan et al. |
| 6,068,276 A | 5/2000 | Kallstrom |

(Continued)

FOREIGN PATENT DOCUMENTS

AU 2022287567 A1 * 10/2023

*Primary Examiner* — Kevin Hurley
*Assistant Examiner* — Felicia L. Brittman
(74) *Attorney, Agent, or Firm* — Mario Theriault

(57) ABSTRACT

The equipment trailer has an A-frame on the front end thereof; a hitch on a forward end of that A-frame and a mechanical landing gear on a back end of the A-frame. This equipment trailer also has a pneumatic landing gear mounted to the A-frame between the hitch and the mechanical landing gear. The mechanical landing gear is operable for hitching and unhitching the equipment trailer to and from the truck at overnight parking locations, and the pneumatic landing gear is operable for hitching and unhitching the equipment trailer to and from the truck at job site locations.

1 Claim, 4 Drawing Sheets

(56) References Cited

U.S. PATENT DOCUMENTS

| | | |
|---|---|---|
| 6,116,631 A | 9/2000 | Logan et al. |
| 6,182,997 B1 | 2/2001 | Ullrich et al. |
| 6,394,734 B1 | 5/2002 | Landoll et al. |
| 6,746,037 B1 | 6/2004 | Kaplenski et al. |
| 6,857,643 B2 | 2/2005 | Neider |
| 6,948,702 B1 | 9/2005 | Nigro |
| 7,108,272 B1 | 9/2006 | Gurtler |
| 7,441,781 B2 | 10/2008 | Luke |
| 8,016,316 B1 | 9/2011 | Carlton |
| 8,998,239 B2 | 4/2015 | Vlahakis |
| 9,050,920 B2 | 6/2015 | Aubrey et al. |
| 10,086,888 B2 | 10/2018 | Trowbridge et al. |
| 10,308,087 B1 | 6/2019 | Frosch et al. |
| 2023/0219479 A1* | 7/2023 | Jarvis ..................... B60P 1/286 414/470 |

* cited by examiner

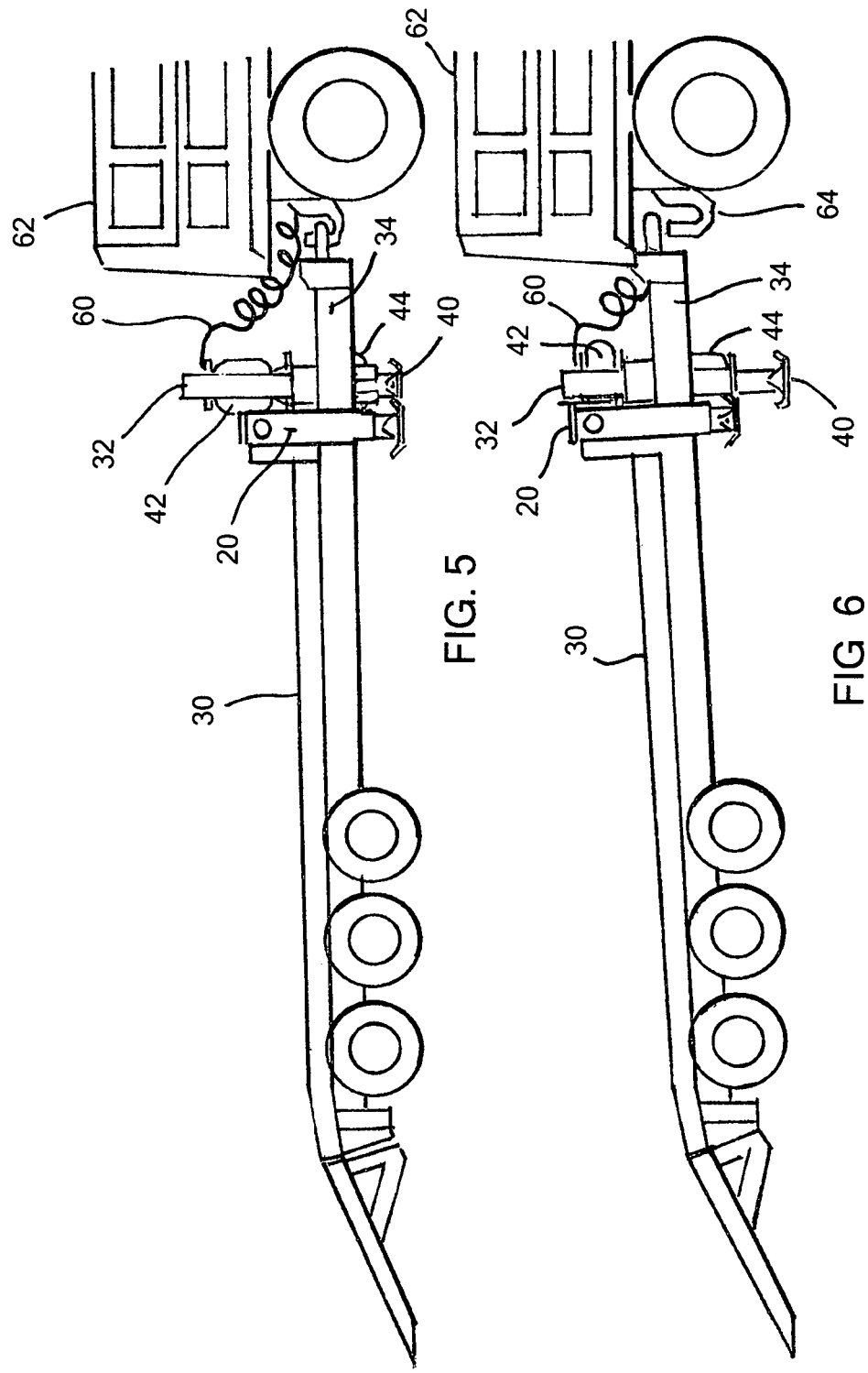

EQUIPMENT TRAILER WITH DUAL LANDING GEAR, FOR SHORT/LONG TERM PARKING

This patent application claims the benefit of U.S. Provisional Application No. 63/100,392, filed Mar. 10, 2020.

FIELD OF THE INVENTION

The present invention pertains to landing gears on construction trailers.

BACKGROUND

Earth moving equipment is often moved with a trailer pulled by a gravel truck. In a typical job, an excavator and a dump truck are all that are required to do landscaping work, culverts, driveways, retaining wall work, drainage pipe installations, pole settings, stump removals, patio work, sidewalk and curb work, septic tank installations, etc. In a typical job, the excavator is unloaded from the trailer, and the trailer is unhitched and parked. The excavator is used to load the truck with the material dug from the site, or to spread the gravel or topsoil brought onto the site by the truck. Several loads are often done until the job is completed. Then, the trailer is hitched back to the truck, the excavator is loaded onto the trailer and moved to the next job site. More than one job may be completed in a single day.

These equipment trailers are generally equipped with a mechanical screw-type landing gear 20 that is operated by a crank 22 as can be seen in FIGS. 1 and 2. The screws inside each leg has a large mechanical advantage, and the extension or retraction of the legs requires several turns on the crank. The lowering and raising of these mechanical landing gears is relatively strenuous. When a contractor moves machinery several time in a day, the raising and lowering of the landing gear represented a substantial amount of effort, arm strain and idle time.

SUMMARY

In one aspect of the present invention, there is provided an equipment trailer comprising an A-frame mounted to the front end thereof; a hitch mounted to a forward end of that A-frame and a mechanical landing gear mounted to a back end of the A-frame and the forward portion of the floor of the trailer. This equipment trailer also has a pneumatic landing gear mounted to the A-frame between the hitch and the mechanical landing gear.

In another aspect of the present invention, there is provided a method of performing earth moving jobs at job site locations, away from an overnight parking location, using a truck, an earth moving machine and an equipment trailer having a mechanical landing gear and a pneumatic landing gear mounted thereto in tandem. This method comprises the steps of:
  operating the mechanical landing gear for hitching and unhitching the equipment trailer to and from the truck at an overnight parking location, and
  operating the pneumatic landing gear for hitching and unhitching the equipment trailer to and from the truck at job site locations.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the equipment trailer according to the present invention is described with the aid of the accompanying drawings, in which like numerals denote like parts throughout the several views.

FIGS. 5 and 6 illustrate side views of the preferred trailer with the pneumatic landing gear retracted and extended respectively.

The drawings presented herein are presented for convenience to explain the functions of all the elements included in the preferred embodiment of the present invention. Elements and details that are obvious to the person skilled in the art may not have been illustrated. Conceptual sketches have been used to illustrate elements that would be readily understood in the light of the present disclosure. These drawings are not fabrication drawings, and should not be scaled.

Figure 3:
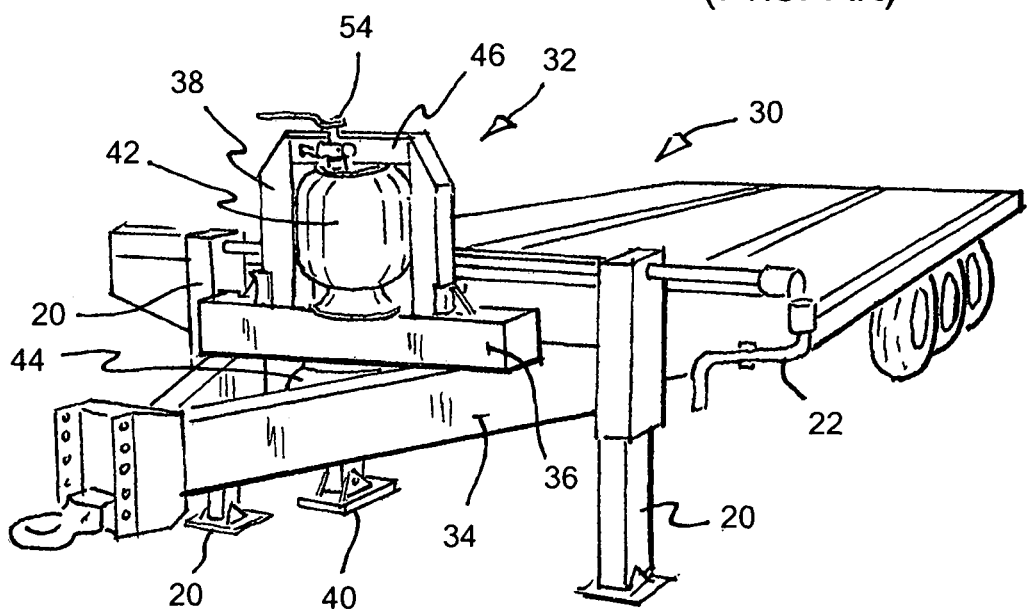
FIG. 3 illustrates front and side perspective views of the equipment trailer according to the preferred embodiment of the present invention, with a pneumatic landing gear mounted to the A-frame thereof.
Figure 4:
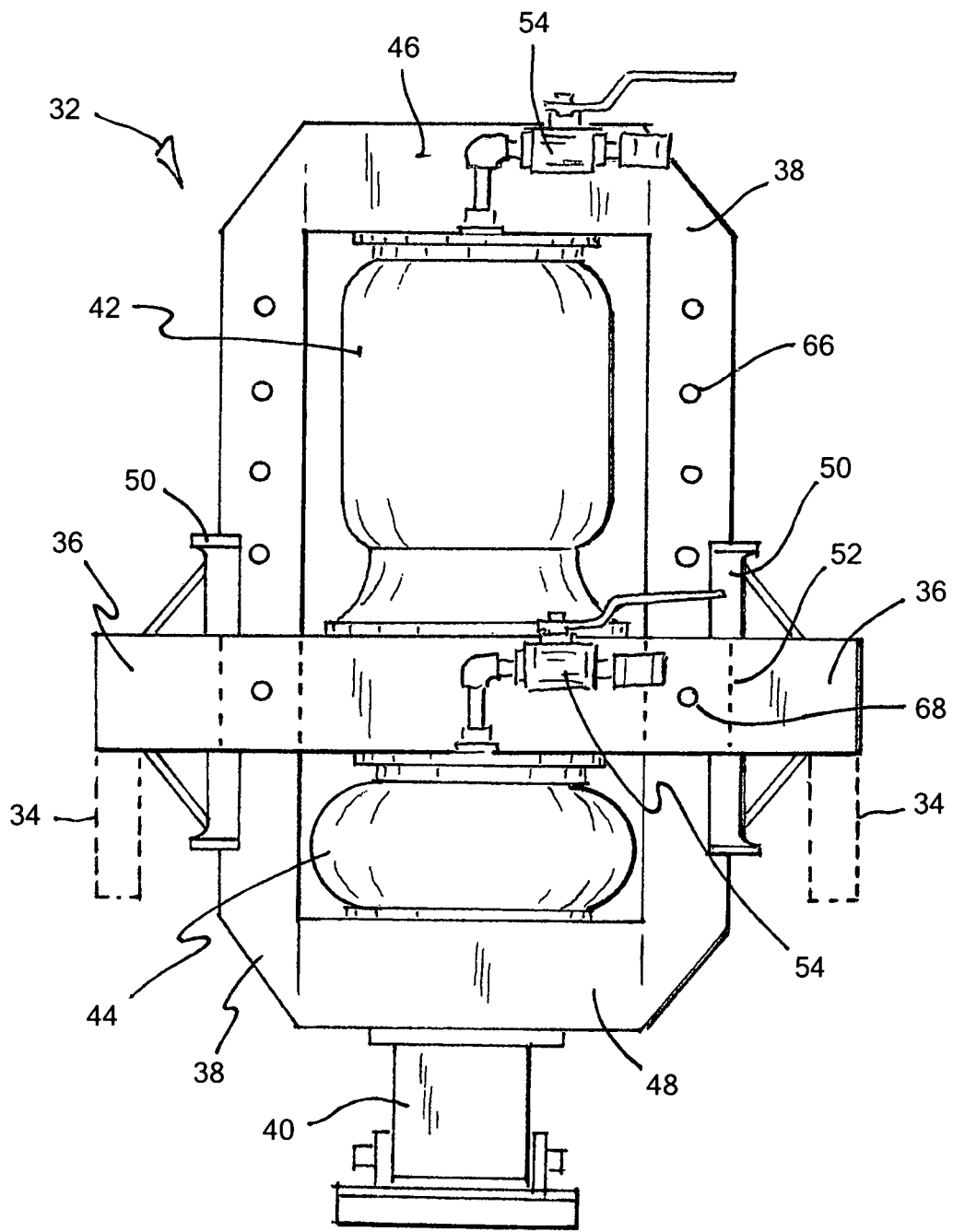
FIG. 4 is a cross-section view along the longitudinal axis of the trailer, at the A-frame portion of the trailer, showing details of the pneumatic landing gear.

Referring now to FIG. 3, the equipment trailer 30 according to the present invention has a mechanical landing gear 20 and a pneumatic landing gear 32 mounted alongside the mechanical landing gear 20 on the A-frame 34 of the trailer 30.

The mechanical landing gear 20 as illustrated, is conventional and does not need further explanation. The pneumatic landing gear 32 will be described in the following paragraphs when making reference with in FIGS. 3 to 6.

The pneumatic landing gear 32, has a cross beam 36, such as 6 inch by 6 inch HSS for example. This cross beam 36 is mounted by U-bolts, by welding or otherwise to the A-frame 34 of the trailer 30, alongside the mechanical landing gear 20. A rectangular slider frame 38 preferably made of 4 inch by 4 inch HSS, slides up and down through two corresponding openings through the cross beam 36. The bottom portion of the slider frame 38 has one or two legs 40 mounted thereto, (only one is shown for convenience).

The movement of the slider frame 38 relative to the cross beam 36 is actuated by two air bags 42, 44 mounted to the cross beam 36. The upper air bag 42 is mounted between the upperside cross-member 46 of the slider frame 38, and the upper side of the cross beam 36. The lower air bag 44 is mounted between the lower cross-member 48 of the slider frame 38 and the underside of the cross beam 36. Guides 50 may be provided on the cross-beam 36 to guides the movement of the slider frame 38 through the openings 52 through the cross beam 36. Air valves and quick-disconnect coupling assemblies 54 are mounted to each air bag 42, 44 to connect each air bags to the air hose 60 and compressor of the dump truck 62, as can be seen in FIGS. 5 and 6. As can be understood, the inflation of the upper air bag 42 causes the slider frame 38 to raise relative to the cross beam 36, thereby raising the leg 40 relative to the A-frame 34. Similarly, the inflation of the lower air bag 44 and the deflation of the upper air bag 42 causes the slider frame 38 and the leg 40 to lower until the leg 40 touches the ground. The leg 40 touching the ground causes the A-frame 34 to rise and to disengage the A-frame 34 from the hitch 64 of the truck 62 as can be appreciated from the illustration in FIG. 6.

The slider frame 38 also has series of holes 66 therein, selectively aligning with a pair of holes 68 in the cross beam 36, or with other stopper, to keep the slider frame 38 in a fixed position relative to the cross beam 36, when desired.

Figure 1:
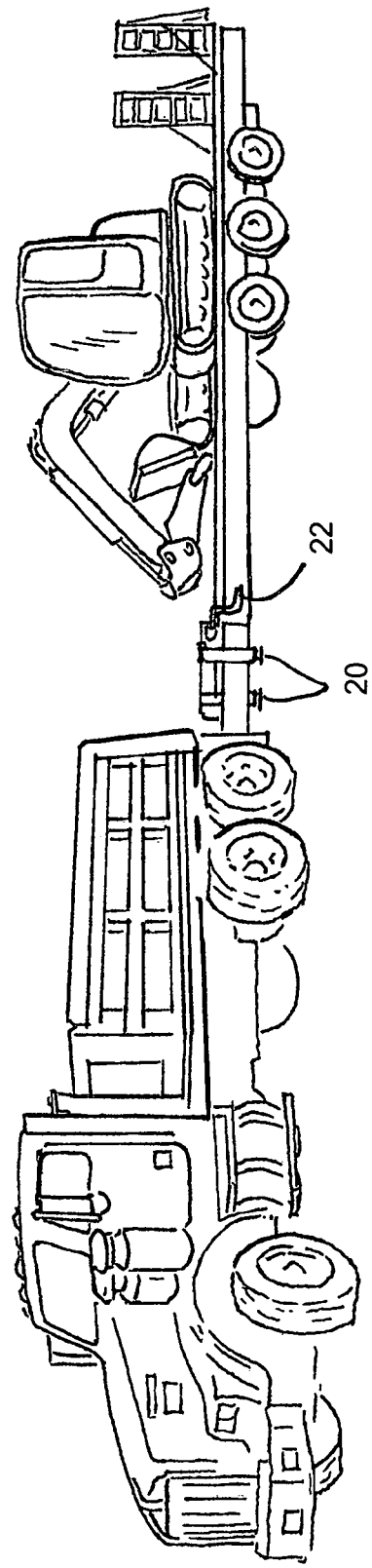
FIGS. 1 and 2 illustrate two front and side perspective views at different scales of a conventional equipment trailer.
Figure 2:
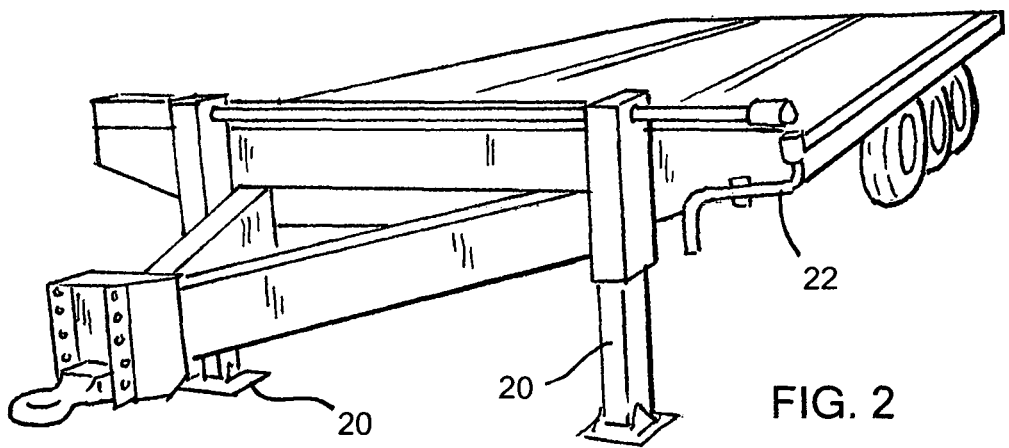

Although the pneumatic landing gear 32 may not have the capacity of a mechanical landing gear 20, the pneumatic landing gear 32 is convenient for handling an empty trailer or smaller equipment, such as a mini-excavator as illustrated in FIG. 1, a small bulldozer or a common backhoe tractor, for examples. Therefore, the pneumatic landing gear 32 is used with smaller equipment, for short term parking between relatively smaller jobs, and the mechanical landing gear 20 is used with large excavating equipment for long term parking between larger projects. The pneumatic landing gear 32 is convenient to reduce cranking workload and idle time during a contractor's workday.

What is claimed is:

1. An earth-moving equipment trailer comprising:

an A-frame on the front end thereof, a hitch on a forward end of said A-frame; and a conventional double-legged mechanical landing gear on a back end of said A-frame;

a cross beam mounted across said A-frame alongside said mechanical landing gear between said hitch and said mechanical landing gear, a pneumatic landing gear mounted to said cross beam; said pneumatic landing gear comprising a ground-contacting leg mounted under a slider frame extending through said cross beam; said slider frame and said ground-contacting leg being movable relative to said cross beam by two air bags mounted into said slider frame; said two air bags being fastened to the top and bottom sides of said cross beam respectively, and to said slider frame, said bottom air bag being inflatable with said top air bag being deflated for extending said ground-contacting leg toward a ground surface and said top air bag being inflatable with said bottom air bag being deflated for raising said ground-contacting leg up from said ground surface.

* * * * *